2 Sheets—Sheet 1.
L. L. & D. LUMBERT.
Cranberry Gatherers.
No. 198,641. Patented Dec. 25, 1877.
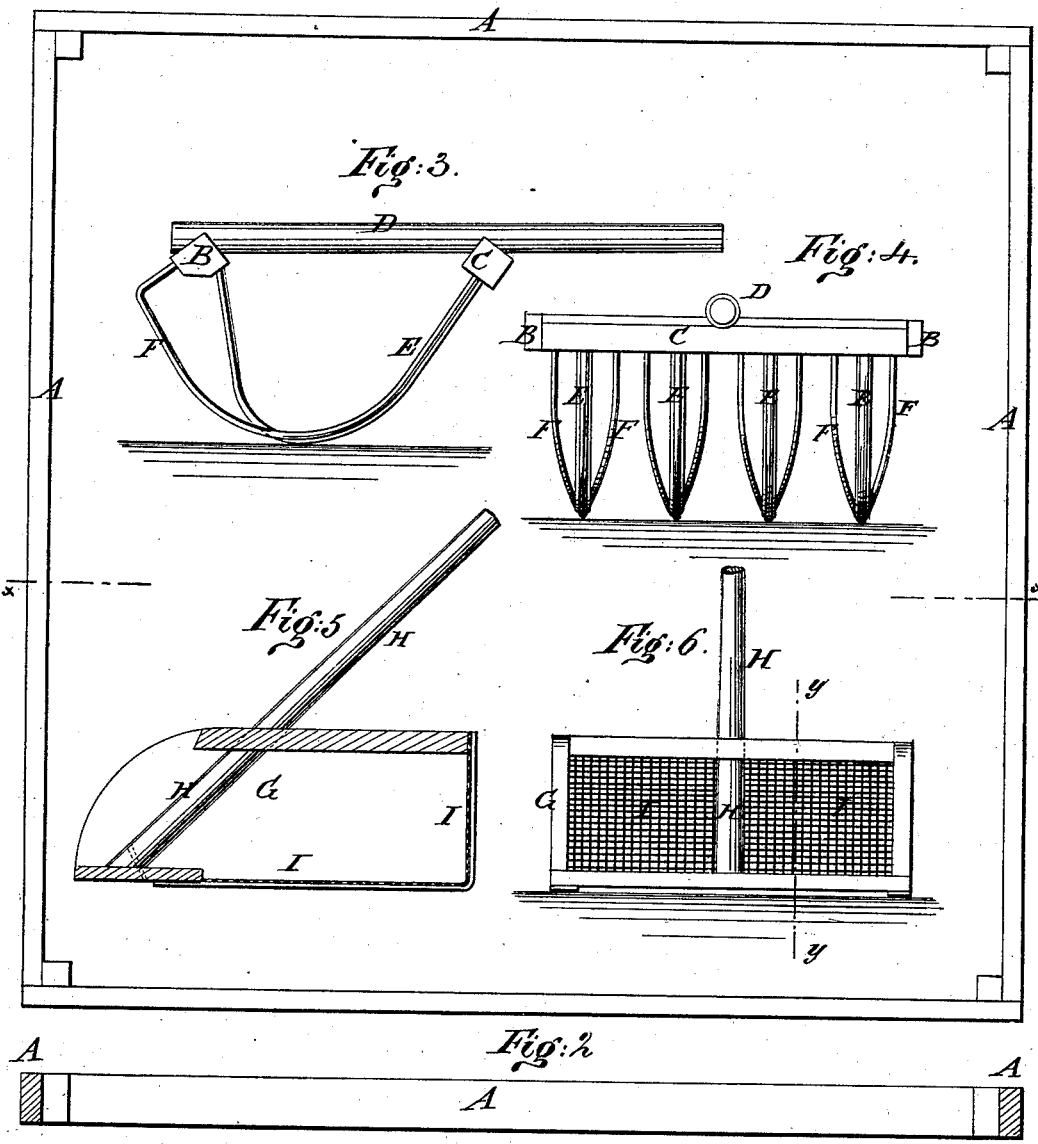
WITNESSES:
Chas. Nida.
J. H. Scarborough.
INVENTORS
L. L. Lumbert
BY D. Lumbert.
ATTORNEYS.

L. L. & D. LUMBERT.
Cranberry Gatherers.

No. 198,641. Patented Dec. 25, 1877.

UNITED STATES PATENT OFFICE.

LEONARD L. LUMBERT AND DANIEL LUMBERT, OF MARSTON'S MILLS, MASS.

IMPROVEMENT IN CRANBERRY-GATHERERS.

Specification forming part of Letters Patent No. 198,641, dated December 25, 1877; application filed May 28, 1877.

*To all whom it may concern:*

Figure 8:
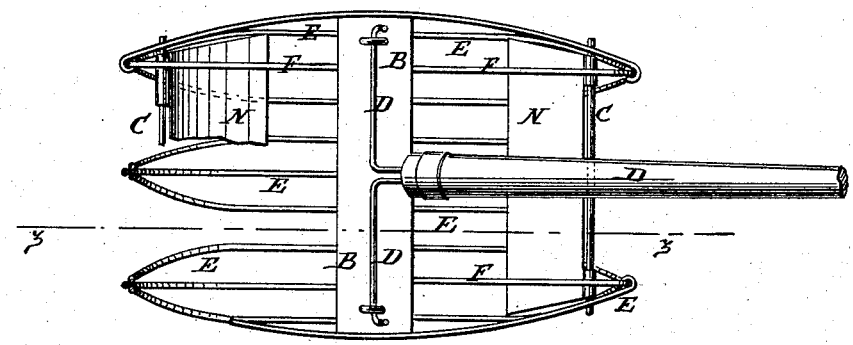
Figure 9:
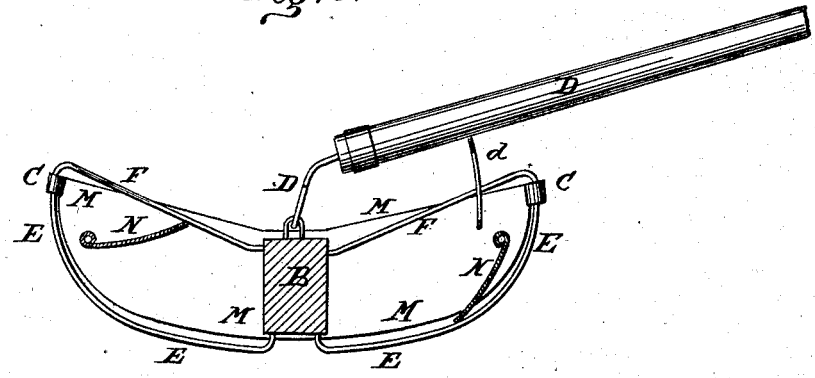

Be it known that we, LEONARD L. LUMBERT and DANIEL LUMBERT, of Marston's Mills, county of Barnstable and State of Massachusetts, have invented a new and Improved Apparatus for Gathering Cranberries, of which the following is a specification:

Figure 1, Sheet 1, is a plan view of a frame to be placed over a portion of a cranberry-patch to confine the berries when separated from the vines. Fig. 2, Sheet 1, is a cross-section of the same, taken through the line $x\,x$, Fig. 1. Fig. 3, Sheet 1, is a side view of a rake for separating the berries from the vines. Fig. 4, Sheet 1, is a rear view of the same. Fig. 5, Sheet 1, is a longitudinal section taken through the line $y\,y$, Fig. 6, of the dipper for removing the berries from the water. Fig. 6, Sheet 1, is a front view of the same. Fig. 7, Sheet 1, is a cross-section of the frame for drying the berries. Fig. 8, Sheet 2, is a top view of a modified form of the rake, part being broken away to show the construction. Fig. 9, Sheet 2, is a longitudinal section of the same, taken through the line $z\,z$, Fig. 8.

Similar letters of reference indicate corresponding parts.

The object of this invention is to furnish an improved apparatus for gathering cranberries, especially where the patch can be flooded with water, which shall be simple in construction and convenient and effective in use, enabling the cranberries to be gathered much faster than when gathered in the usual way.

The invention will first be described in connection with the drawings, and then pointed out in the claims.

In the drawings, A is a frame, made of boards about four inches wide and twenty feet long, strengthened at the corners by blocks. The frame A is to be placed upon the water, over the portion of the patch from which the berries are to be gathered. The operator then enters the frame A with his rake, which is formed as hereinafter described. D is the handle, to which, at its forward end and at a little distance from said forward end, are attached two cross-bars, B C, about two feet long. To the cross-bars B C are attached bars or rods E, the forward parts of which are at such a distance apart that the berries can pass in between them readily. The rear parts of the bars or rods E are branched, the branches of each bar inclining from each other, so that the branches of the adjacent bars may approach each other so nearly that the berries cannot pass between them, but will be drawn from the vines as the said rake is drawn toward the operator. The rear parts of the bars or rods E may be strengthened by braces F, if desired.

The cranberries are removed from the water with the dipper, which is formed by attaching a box, G, to a handle, H. The box G is made with its forward end open, and with its rear end and the rear part of its lower side made of wire-gauze I, to allow the water to flow out freely while retaining the berries. The berries are poured from the dipper G H I into boxes in a boat, which the operator has near him, and which is not shown in the drawing.

When a sufficient quantity of the berries have been gathered they are spread upon the wire-gauze bottom J of the frame K, to drain and dry and be prepared to be packed in barrels or boxes for market.

The frame K should be about four feet wide and of any desired length, and is supported at a convenient height by legs L attached to it.

In the modification of the rake shown in Figs. 8 and 9 the forward end of the handle D is forked, and is pivoted to the bar B, which is made larger, and has a set of the bars or rods E attached to each of its sides. The bars C are made smaller, and are not attached to the handle D, being simply designed to keep the forward ends of the bars or rods E in their proper relative positions. In this case the braces F extend from the forward ends of the bars or rods E to the bar B. The handle D is connected with the central brace-rod F by a long staple, $d$, attached to the said handle and passing around the central brace-rod F. This construction enables the rake to adjust itself into proper position for removing the berries from the vines, as it is moved back and forth without its being necessary to raise and lower the handle. In this case the sides of the rake are inclosed by plates M, and to the bars C are hinged plates N, covering the wider parts of the spaces between the bars or rods E, so that the berries cannot escape after once entering the rake. This construction adapts the rake to be also used for gathering berries upon dry ground.

Having thus fully described our invention, we claim as new and desire to secure by Letters Patent—

1. The rake for drawing the berries from the vines, formed of the handle D, the cross-bars B C, the bars or rods E, and the braces F, substantially as herein shown and described.

2. The combination of the side plates M and the hinged plates N with the rake D B C E F, substantially as herein shown and described.

LEONARD L. LUMBERT.
DANIEL LUMBERT.

Witnesses:
  F. G. KELLY,
  B. F. CHILDS.